Aug. 19, 1958 J. S. PUGH 2,847,973
DEVICE FOR AQUARIUMS OR THE LIKE
Filed Oct. 31, 1955 2 Sheets-Sheet 1

INVENTOR
Joe S. Pugh

BY *Walter J. Jagman*

ATTORNEY

Aug. 19, 1958  J. S. PUGH  2,847,973
DEVICE FOR AQUARIUMS OR THE LIKE
Filed Oct. 31, 1955  2 Sheets-Sheet 2

INVENTOR
Joe S. Pugh

BY
ATTORNEY

United States Patent Office 2,847,973
Patented Aug. 19, 1958

2,847,973

DEVICE FOR AQUARIUMS OR THE LIKE

Joe S. Pugh, Hamilton, Tex., assignor to Nu-Lite Neon Company, Hamilton, Tex.

Application October 31, 1955, Serial No. 543,789

2 Claims. (Cl. 119—5)

This invention relates to ornamental and aerating devices for aquariums or the like and a new method for lighting aquariums.

An object of this invention is to provide a new and improved ornamental device for aquariums or the like.

Another object of the invention is to provide a new and improved ornamental device for aquariums or the like which produces moving air bubbles.

Still another object of the invention is to provide a device, of the type described above, having means for producing moving multi-colored reflections.

A further object of the invention is to provide a device for aquariums or the like which introduces pleasing colors into the aquariums.

A still further object of the invention is to provide an ornamental device which has a device for producing moving bubbles of air in a predetermined path in the aquarium and has a means for projecting light of different colors into the aquarium into the device to be reflected from the moving bubbles, thus creating a moving, colorful effect in the aquarium.

Another object is to provide a means for lighting an aquarium from one end of an aquarium, instead of from above, which does not cause swim bladder imbalance in fish present in the aquarium.

Still another object of the invention is to provide a means for lighting an aquarium which projects light of different colors, instead of white light, into the water from one end of the aquarium whereby multicolored reflections from fish and objects in the aquarium are perceived by observers stationed before a side of the aquarium.

A further object of the invention is to provide a reflector which may be placed in the aquarium to reflect the multicolored light projected into the aquarium.

A still further object of the invention is to provide a new method of lighting aquariums.

Still another object is to provide an ornamental device of the type described above wherein source of the light of different colors cannot be readily perceived by the observer.

Another object of the invention is to provide an ornamental device for aquariums which also functions as an aerator.

A further object of the invention is to provide an aerator which provides a long path of slow movement for air bubbles while in water whereby the water may absorb an optimum amount of oxygen from the air in the air bubbles.

Other objects and advantages will become apparent from the following description wherein reference is made to the drawing.

Figure 1:
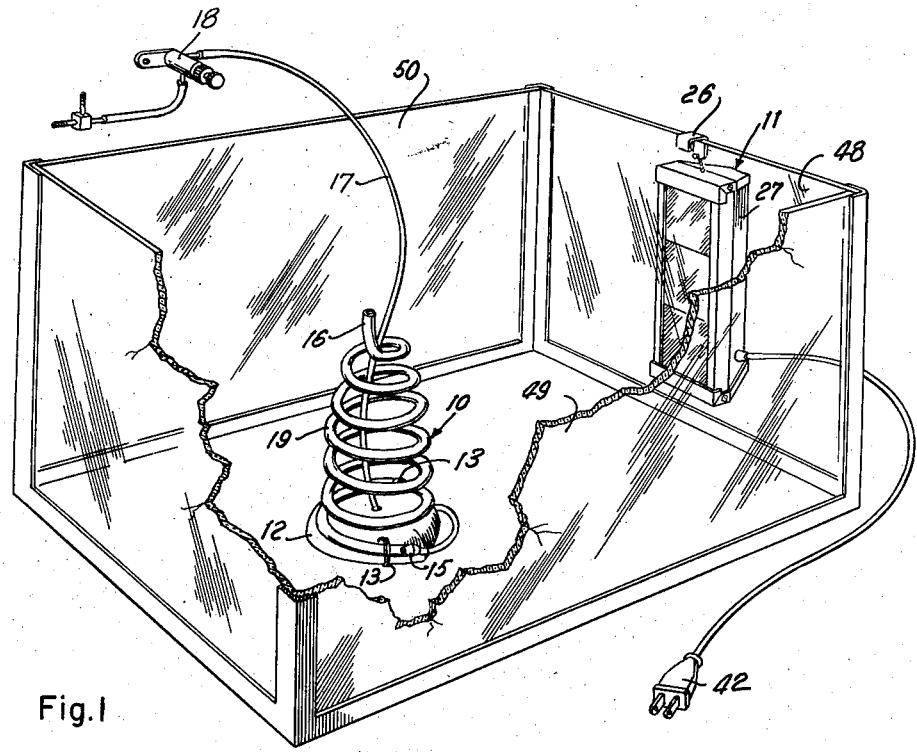
Figure 1 is a perspective view of the ornamental device in position in an aquarium, which is partly broken away, and showing the light producing means suspended on one wall of the aquarium.

Aquariums are often used for their decorative effect and for such applications it is desirable to make the aquariums have a more colorful effect than the green effect that is usually provided by the vegetation in the aquarium. It is also desirable that any multicolored effect produced have a pleasing movement whereby the attention of observers may be drawn to the aquarium. The ornamental device 10 illustrated in Figures 1 and 2 of the drawing in conjunction with the light producing device 11 provides such a multicolored moving effect.

The ornamental device 10 includes a substantially dome shaped opaque base 12 to which is secured, by clips 13, a transparent tube 14 which ascends gradually in any desired manner, as in the spiral manner shown, upwardly from its lower end 15 to its upper end 16. A flexible tubing 17 has one end connected to the outlet of a needle valve 18, and extends through the coils of the tube 14 and the apertures 19 and 20 of the base into a fitting 21 which connects the lower end of the flexible tubing to the lower end of the tube 14. The fitting 21 is preferably of rubber or other similar resilient substance and has a groove 22 in the outer surface thereof which admits water from the aquarium into the lower end of the tube 14. The upper end 16 of the tube 14 may extend above the surface of the water in the aquarium although the device will function just as well if the upper end is also submerged.

The inlet of the valve 18 is connected to a suitable source of air under pressure, such as a conventional electrically driven pump, not shown, through a conduit 24. The inlet end of the conduit 24 may be connected to one outlet 25 of the usual T-fitting 26. Any other desired aquarium device, such as a filter, may be connected to the other outlet 28 of the T-fitting. The inlet 29 of the fitting is, of course, connected to a pump or other source of air under pressure.

The valve 18 is adjusted to permit air at a predetermined desired rate to flow through the tubing 17 into the lower end of the tube 14 where it produces bubbles of air, in the tube 14, which ascend upwardly in the tube. Water which enters into the lower end of the tube 14 through the groove 22 of the fitting is moved upwardly between the bubbles of air and is expelled from the upper end 16 of the tube to flow back into the aquarium. It will be apparent that the water so exposed to air in the tube absorbs oxygen from the air bubbles and thus the device 10 not only serves as an ornamental device but also as an aerator. An optimum amount of oxygen is absorbed from the air in the bubbles since the rate of movement of the bubbles is slowed by the friction between the moving water and the inner walls of the tube. Moreover, the path through which the water and the bubbles of air must move in the tube is much greater than the straight upward path taken by air bubbles freely escaping at the bottom of an aquarium from a conventional aerator. In addition, if the end 16 of the tube is above the top surface of the water in the aquarium, the water moved upward by the air bubbles is thrown into the air at the upper end and is thus further exposed to air. Accordingly, it will be seen that the air moving upwardly in bubbles through the tube is held in contact with water carried upwardly between air bubbles for a long time due to the slowed rate of movement of the air bubbles and the long path which they must travel so that an optimum amount of oxygen is absorbed from the air by the water which then absorbs still more oxygen from the air above the water upon being expelled from the upper end of the tube. It will also be seen that water from the lower end of the aquarium, which has a relatively small amount of oxygen, is moved upwardly through the aerator between the bubbles so that a vertical circulation of water within the aquarium results providing properly oxygenated water at all levels of the aquarium.

The bubbles of air in the tube are visible to an observer since the tube 14 is made of glass, plastic or other suitable transparent substance. When viewed under ordinary white light, the air bubbles, of course, are colorless and do not produce any color effect.

In order to provide a moving multicolored effect in the aquarium, the light producing device 11 is suspended by means of the hook 26 from the end of the aquarium. The light producing means comprises a housing 27 provided at its ends with caps 28 secured thereto by screws 29. A vertical plate 30 disposed in the housing 29 has three concave portions 31 having central apertures through which extend rearwardly the ends 32 of light bulbs or lamps 33 which are disposed in the concave portions of the plate. The ends of the bulbs are held by clips 34 secured to the concave portions by screws 35 and nuts 36.

The bulbs 33 are connected in parallel across the output leads 37 and 38 of a voltage reducing transformer 39 whose input leads 40 and 41 terminate in a conventional plug 42 which may be connected in any conventional outlet. The transformer 39 is disposed in the housing behind the plate 30 and rests on the bottom cap 28.

Disposed in the housing outwardly of the plate 30 and in front of the bulbs 33 are three colored glass plates 44, 45 and 46, each differing in colors from the others. For example, the top glass plate 44 may be blue, the middle glass plate 45 may be red and the bottom glass plate 46 may be green. The glass plates preferably have one of the primary colors, i. e., red, blue, green or yellow.

In use, the light passed through each of the glass plates is of a particular color and is projected through the glass end wall 48 of the aquarium into the aquarium and out of the tube 14. The water surfaces about and defining the air bubbles act as reflectors reflecting the multicolored light projected into the aquarium by the device 11 toward the obserber through the front and rear sides 49 and 50 of the aquarium. Since the bubbles are constantly moving, the varied colored light reflected toward the observer constantly moves and shifts the colors shifting and blending in the process so that the total effect is pleasing and intriguing to the observer.

The housing 29 hides the bulbs 33 from the view of an observer in front of the aquarium so that the observer sees the light emitted by these bulbs only as it is reflected by the water surfaces of the air bubbles as they rise through the tube although some may also be reflected off the tube itself.

It will now be seen that a new and improved ornamented device 10 has been illustrated and described which includes a transparent tube 14 which provides a long path of ascent for air bubbles introduced into the lower end thereof whereby the friction of the water entrained between the air bubbles and the inner surface of the tube and the long path of ascent ensure an optimum absorption of oxygen by the water from the air bubbles. Moreover, it will be apparent that light of several different colors is projected into the aquarium and out the device 10 by the light emitting source 11 which is disposed outside the aquarium and thus does not have to be of watertight construction. It will also be seen that the different colored light reflected by the water surfaces defining the air bubbles is of several different colors which move as the bubbles rise in the tube thus causing the observer to see a moving multicolored effect within the aquarium.

It has been discovered that aquariums must be lighted from above for white light projected horizontally through the sides of the aquarium or through the bottom thereof has a deleterious effect upon fish which is known as swim bladder imbalance and therefore side lighting of aquariums has in the past proven unsuccessful. The light producing device 11, however, projects colored light, preferably a plurality of primary colors, and such colored light has proven to have no such harmful effect upon the fish. Accordingly, the new method of lighting an aquarium which does not have a deleterious effect upon the fish comprises projecting colored light, preferably primary colors, horizontally into the aquarium and permitting objects and fish in the aquarium to reflect the colored light to an observer who views the aquarium from a position at the side of the aquarium whereby the line of vision of the observer is at an angle to the direction of projection of the colored light through the aquarium.

The ornamental device 10 can be made of a closed hollow transparent tube, in which case it does not function as an aerator and then serves merely as a reflector of the colored light.

If desired, no reflector of any kind need be placed in the aquarium, the fish and vegetation serving as the reflectors of the colored light. The fish tend to reflect a spectrum, as in a rainbow, when further removed from the light producing means 11 and reflecting a single projected color when near the means 11. For example, when near the blue colored plate 44 near the top of the aquarium, the fish will reflect a blue light and appear blue, when it descends near the red colored plate 45 it will reflect a red light, and when it descends still lower near the green colored plate 46 it will reflect a green light.

If desired, two light producing means 11 may be used projecting light from both ends of the aquarium. Or a reflector, such as aluminum foil, may be secured to the end of the aquarium opposite the end 48 to reflect the colored light for the means 11 back into the aquarium. An ordinary aerator may also be used which merely releases bubbles of air which ascend upwardly and freely through the water in the aquarium. Such bubbles of air will also appear to be multicolored although the effect is not as vivid or as pleasing as when the device 10 is employed as an aerator.

Figure 2:
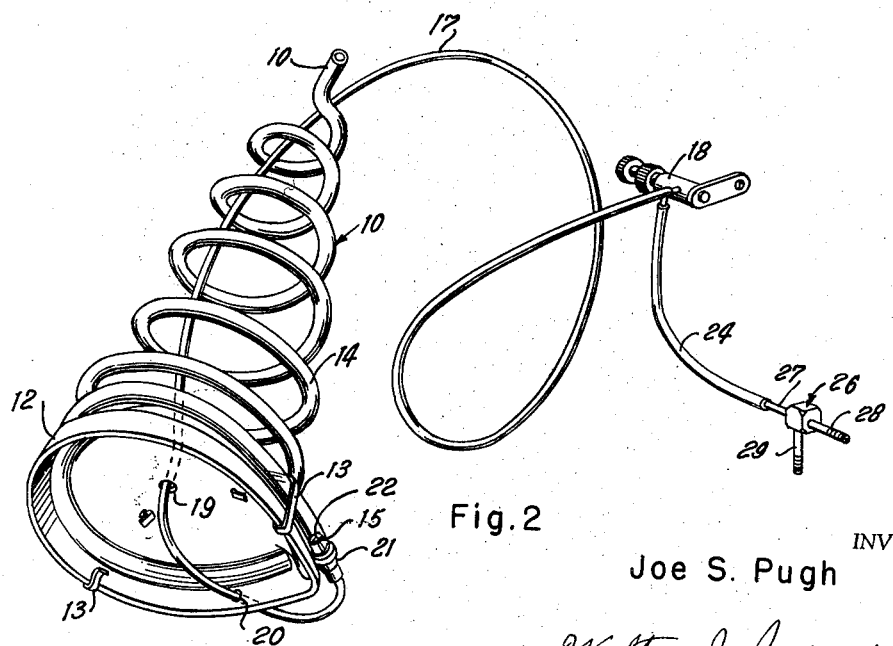
Figure 2 is a perspective enlarged view of the ornamental device.
Figure 4:
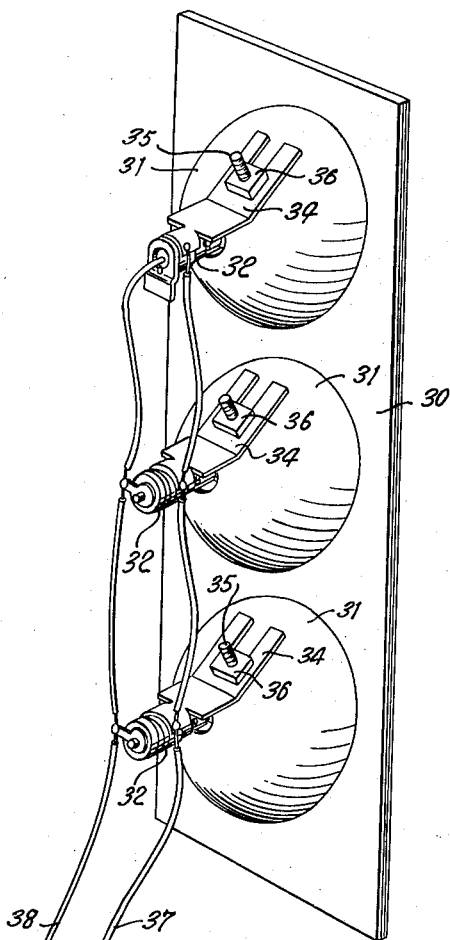
Figure 4 is a front view of the light producing means.
Figure 4:
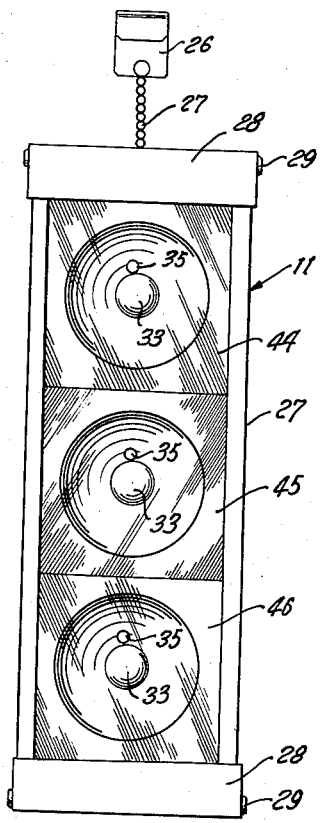
Figure 3:
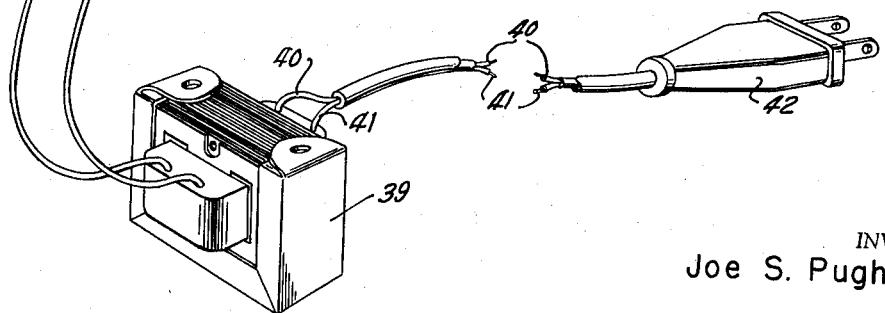
Figure 3 is an enlarged perspective view of the internal components of the light producing means.

If desired, the light emitting means 11 may be sealed against water and may then be placed within the aquarium to project light through the water although the location of the means 11 shown in Figure 1 is preferred.

Manifestly, the construction as shown and described is capable of some modification and such modification as may be construed to fall within the scope and meaning of the appended claims is also considered to be within the spirit and intent of the invention.

What is claimed is:

1. An aquarium illuminating device comprising: a transparent tube having vertically ascending convolutions, adjacent pairs of convolutions being of different sizes, said tube providing an ascending path for air bubbles and having its upper end disposed above its lower end; means for introducing air into the lower end of the tube, said means providing a reduced aperture for admitting water into the lower end of the tube; and a light producing source proximate to said tube having a plurality of color filtering means projecting horizontal beams of light of different colors on said tube whereby the bubbles are illuminated and reflect lights of different colors.

2. The device of claim 1 wherein the colors of the horizontal beams are primary colors.

References Cited in the file of this patent

UNITED STATES PATENTS

| | | |
|---|---|---|
| 1,498,408 | Stoms | June 17, 1924 |
| 1,723,272 | Emma | Aug. 6, 1929 |
| 1,871,742 | Sabath | Aug. 16, 1932 |
| 1,974,068 | Greensaft | Sept. 18, 1934 |
| 2,002,380 | Wernicke et al. | May 21, 1935 |
| 2,016,123 | Schorr | Oct. 1, 1935 |
| 2,293,612 | Montague | Aug. 18, 1942 |
| 2,491,853 | Feldman | Dec. 20, 1949 |
| 2,614,529 | Hansen | Oct. 21, 1952 |
| 2,674,574 | Pettas | Apr. 6, 1954 |
| 2,732,341 | Huff | Jan. 24, 1956 |